H. D. DIBBLE.
CENTRIFUGAL SEPARATOR.
APPLICATION FILED FEB. 18, 1907.

921,371.

Patented May 11, 1909.
5 SHEETS—SHEET 1.

Witnesses
John T. Schrott
Hayward Woodard

Inventor
Harvey D. Dibble.
Fred G. Dieterich
Attorneys.

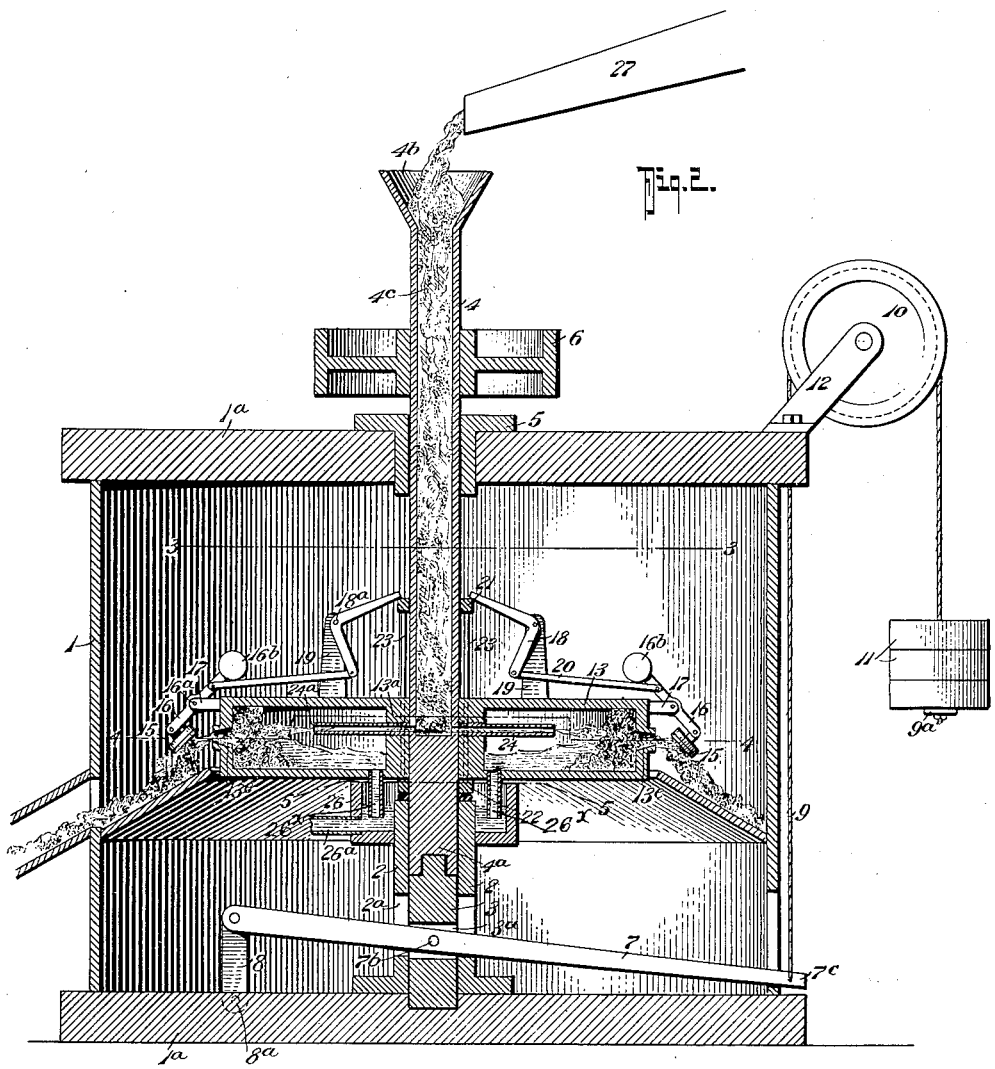

H. D. DIBBLE.
CENTRIFUGAL SEPARATOR.
APPLICATION FILED FEB. 18, 1907.
921,371.
Patented May 11, 1909.
5 SHEETS—SHEET 3.
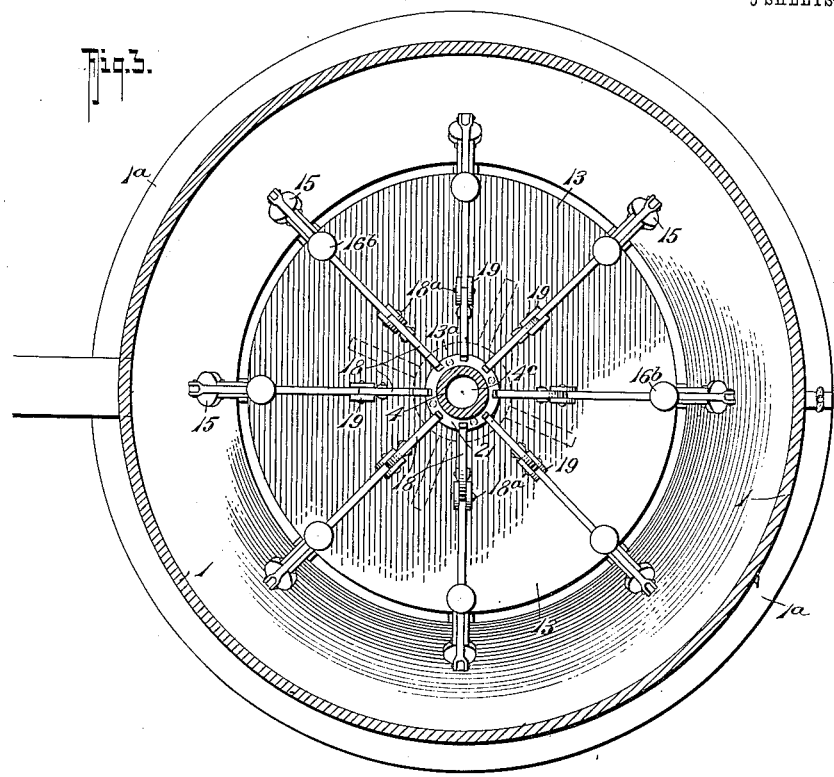
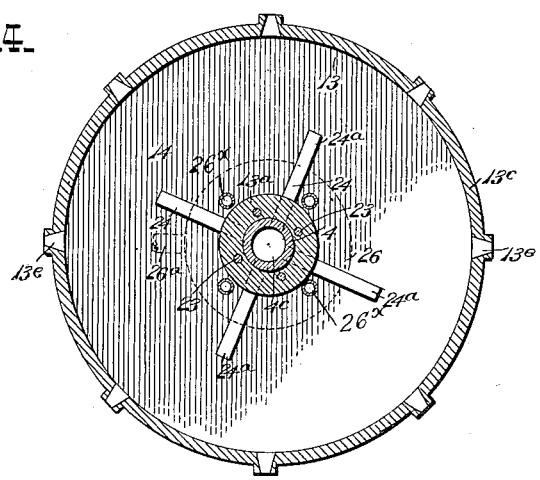
Witnesses
John T. Schrott
Hayward Woodard
Inventor
Harvey D. Dibble.
Fred G. Dieterich
Attorneys H. D. DIBBLE.
CENTRIFUGAL SEPARATOR.
APPLICATION FILED FEB. 18, 1907.
921,371.
Patented May 11, 1909.
5 SHEETS—SHEET 4.
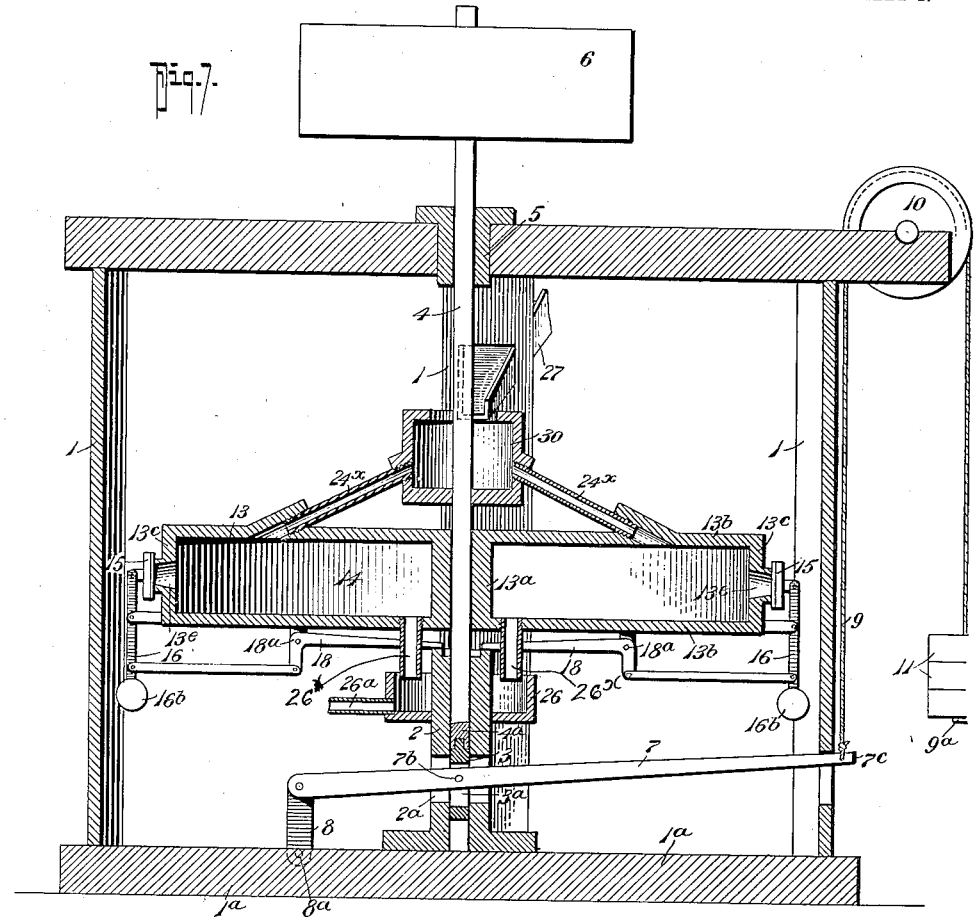
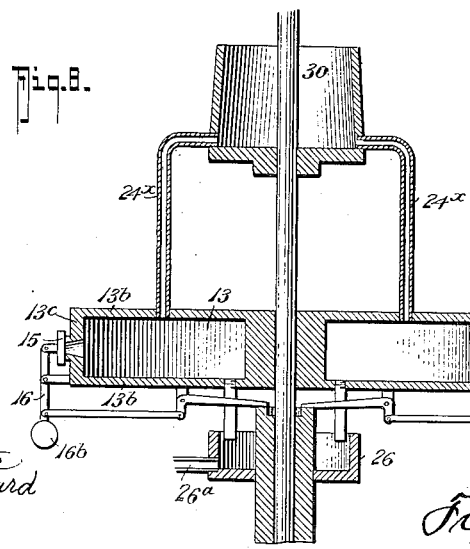
Witnesses
John T. Schrott
Hayward Woodard
Inventor
Harvey D. Dibble.
Fred G. Dieterich
Attorneys.

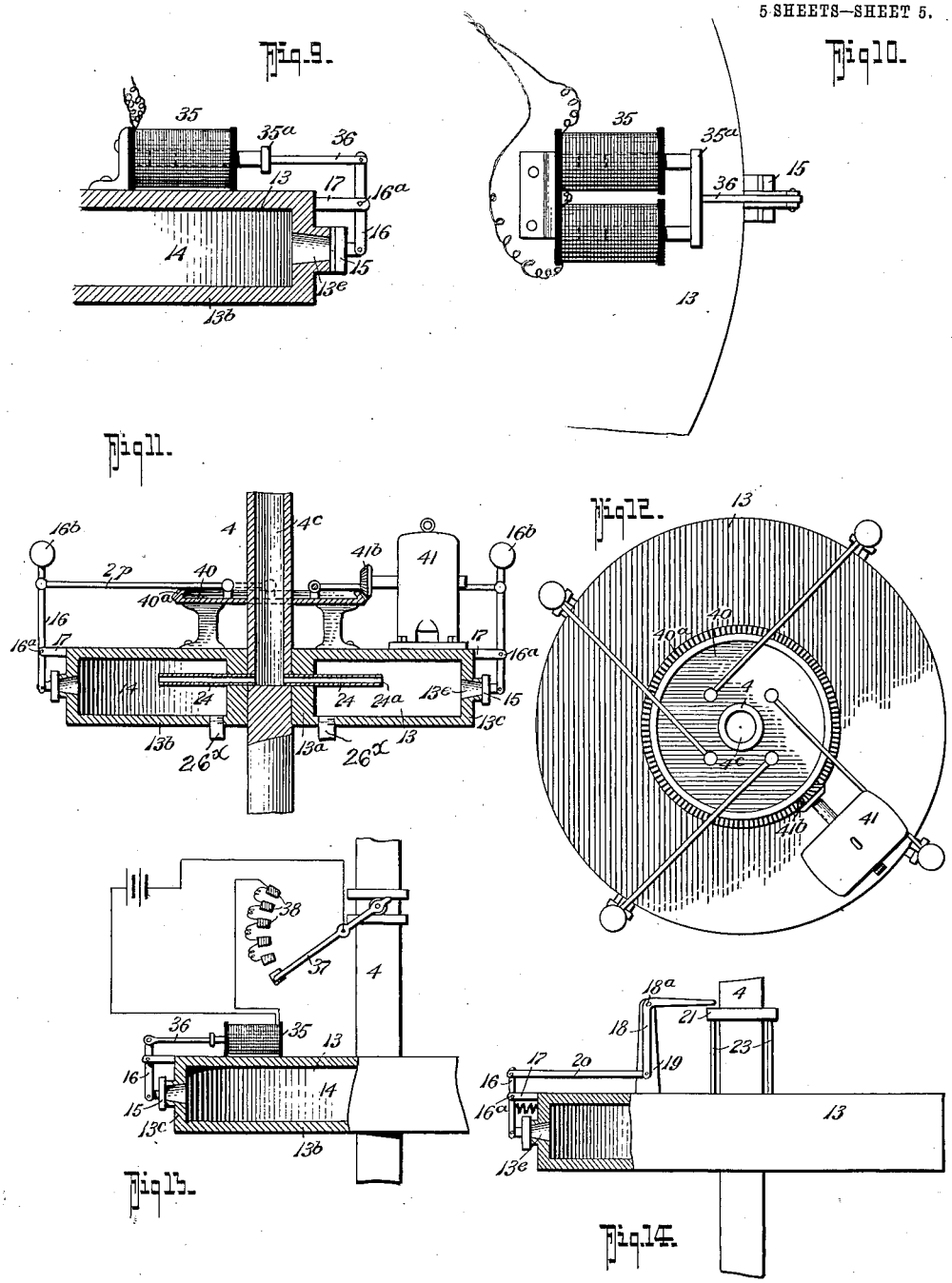

UNITED STATES PATENT OFFICE.

HARVEY D. DIBBLE, OF MYSTIC, SOUTH DAKOTA.

CENTRIFUGAL SEPARATOR.

No. 921,371.  Specification of Letters Patent.  Patented May 11, 1909.

Application filed February 18, 1907. Serial No. 357,979.

*To all whom it may concern:*

Be it known that I, HARVEY D. DIBBLE, residing at Mystic, in the county of Pennington and State of South Dakota, have invented certain new and useful Improvements in Centrifugal Separators, of which the following is a specification.

My invention relates to certain new and useful improvements in centrifugal separators, and it more particularly has for its object to provide a means for cheaply and instantly separating by centrifugal force the clear solution from the slime or sands in any wet process of extracting metals from ores.

The invention also has for its object to provide a separator that can be used as well in separating starch from the wash-water or to separate any solid held in suspension from its liquid, whenever the said solid has a specific gravity greater than that of the liquid.

In its generic nature my invention comprises a separating vessel or bowl having a plurality of valve controlled peripheral outlets, which receptacle is mounted for rotation on an axis at right angles to that of the peripheral outlets, a feed-way leading into the separating bowl and having a plurality of pipes discharging into said bowl, together with means for collecting the lighter material or liquid and conveying it to a desired point and means for automatically controlling and governing the outlet valves of the separating bowl proportionately to the amount of material fed into the bowl.

In its more detailed nature my invention comprises a certain novel construction, combination and arrangement of parts, all of which will be first described in detail and then be specifically pointed out in the appended claims, reference being had to the accompanying drawings, in which:—

Figure 1:
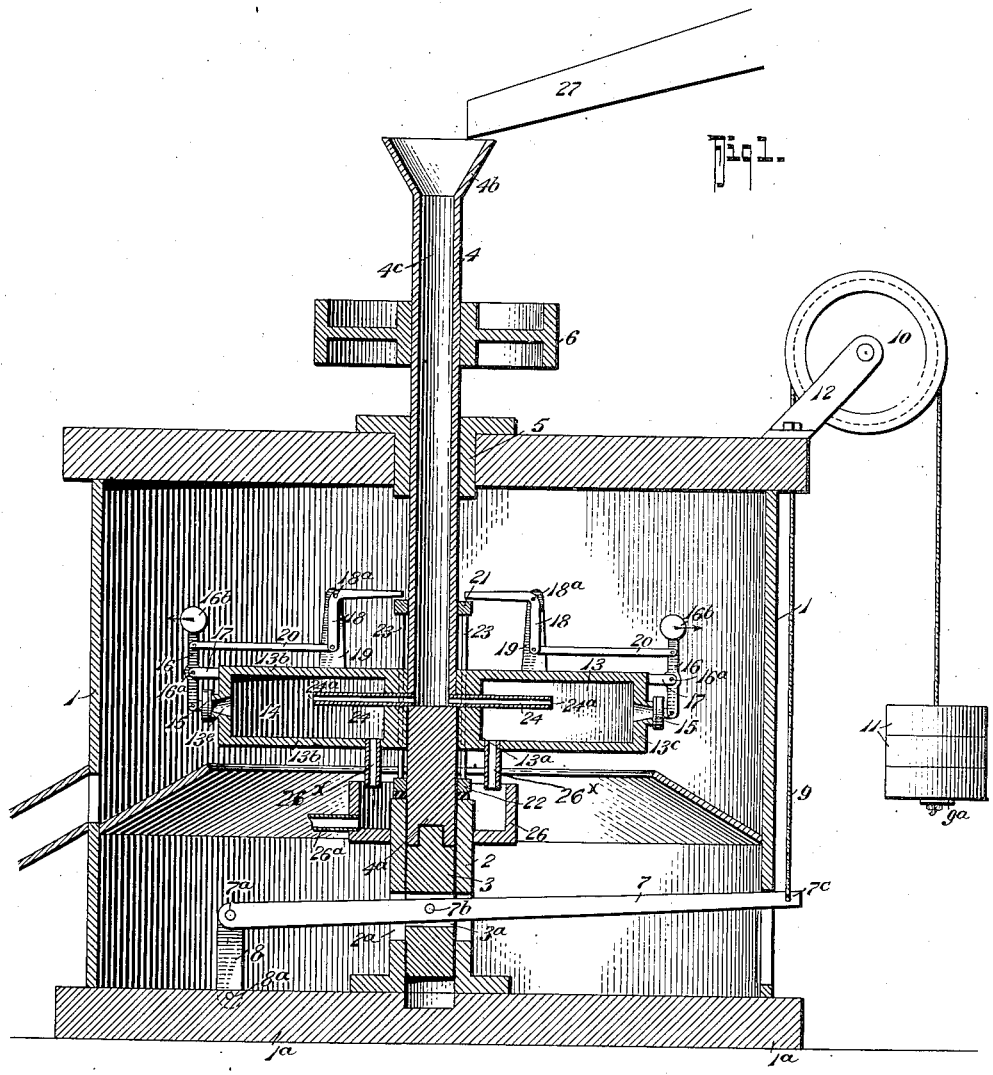
Figure 5:
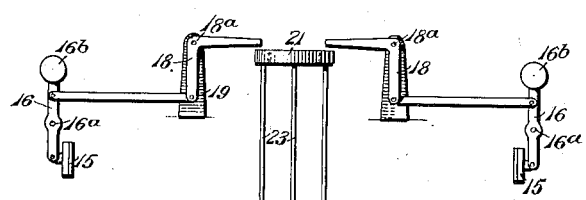

Figure 1, is a central vertical longitudinal section of one form of my invention showing the position of the parts at the beginning of the operation of the machine. Fig. 2, is a similar view showing the position of the parts while the machine is in full operation. Fig. 3, is a horizontal section on the line 3—3 of Fig. 2. Fig. 4, is a similar view on the line 4—4 of Fig. 2. Fig. 5, is a detail section on the line 5—5 of Fig. 2. Fig. 6, is a detail diagrammatic view of the valve operating mechanism, *per se*. Fig. 7, is a central, vertical, longitudinal section of a modified form of my invention. Fig. 8, is a similar view of a further modification thereof. Fig. 9, is a detail, longitudinal section showing a modified form of valve controlling device. Fig. 10, is a top plan view thereof. Fig. 11, is a detail, sectional view of a further modification of the valve controlling device. Fig. 12, is a top, plan view thereof. Fig. 13, is a diagrammatic view of a circuit controlling mechanism for the valve operating devices shown in Figs. 9 and 10. Fig. 14, shows how the valve closing members shown in the form of my invention disclosed in Figs. 1 and 7, may be dispensed with and spring members substituted therefor.

Referring now to the accompanying drawings in which like numerals and letters of reference indicate like parts in all of the figures, 1 designates a supporting framework on the bottom $1^a$ of which a tubular bearing box 2 is secured. Within the box 2 the adjustable step bearing member 3 is held.

The bearing box 2 extends above the step bearing 3 to receive the solid end $4^a$ of the shaft 4 which has a stepped bearing end to coöperate with the stepped bearing 3. The shaft 4 projects through a bearing bushing 5 in the upper portion of the supporting frame and carries a drive pulley 6 as indicated, the upper end of the shaft 4 terminating in a hopper-like mouth $4^b$ which merges with the internal bore $4^c$ of the shaft that extends downward toward the solid bearing end thereof.

The stepped bearing 3 and the bearing box 2 are slotted as at $3^a$ and $2^a$ respectively to permit passage of a lever 7 that is pivoted at $7^a$ to a link 8 that is in turn pivoted at $8^a$ to the supporting frame. The lever 7 is also fulcrumed at $7^b$ to the step bearing 3 and has its outer end $7^c$ secured to a cable 9 that passes over a pulley 10 and carries at its free end a plate $9^a$ upon which a plurality of weights 11 are held. The pulley 10 is mounted in bearings on a suitable bracket 12 projecting from the frame-work 1.

13 designates the separating bowl which comprises a central hub $13^a$ that is secured to the shaft 4 to turn therewith. The separating bowl 13 also includes top and bottom plates $13^b$ and a peripheral rim $13^c$, as indicated, so as to leave an internal separating chamber 14. The peripheral rim $13^c$ is provided at suitable intervals with a plurality of discharge outlets $13^e$ that are normally closed by the valves 15 that are carried by the valve levers 16 which are fulcrumed at 16ª on brackets 17 secured to the periphery of the separating bowl 13, as indicated. The valve levers 16 project upwardly and carry weights 16ᵇ on their upper ends so that the centrifugal force when the shaft 4 is rotated will tend to move the weights 16ᵇ in the direction of the arrow in Fig. 1, to hold the valves 15 seated to close the apertures 13ᵉ.

18 designates bell crank levers fulcrumed at 18ª on brackets 19 secured to the bowl 13 and each bell crank lever has one of its arms connected by a rod 20 with its respective valve levers 16, and each bell crank lever 18 has its other arm projecting toward the axial line of the shaft 4.

21 designates a ring loosely mounted on the shaft 14 above the separating bowl 13, and 22 designates a second ring similarly mounted on the shaft 4 but below the tank 13. The rings 21 and 22 are connected together by a series of rods 23 that pass loosely through apertures in the collar 13ª of the separating bowl 13, while the collar 13ª is adapted at times to engage the upper edge of the bearing box 2 for a purpose presently explained.

24 designates a series of radially disposed pipes projecting through the hub 13ª of the bowl 13 and into the shaft 4 and communicating with the bottom of the bore or passage 4ᶜ within the shaft 4. The pipes 24 have their discharge ends 24ª preferably arranged to discharge at a point slightly farther from the axial line of the shaft 4 than one-half the distance between such axial line of the shaft 4 and the peripheral rim 13ᶜ of the bowl 13. Adjacent the collar 13ª the wheel 13 has a series of pipe outlets in its lower wall which discharge into a tank 26 stationarily held on the bearing member 2 and the tank 26 has an outlet pipe 26ª by means of which the contents of the tank 26 can be conveyed away to any desired point.

27 designates the slime and sand supply sluice from which the slime and sands are deposited into the hopper mouth 4ᵇ of the shaft 4 and gravitated down through the passage 4ᶜ therein to the pipes 24.

When my improved machine is operated, the slimes, sands or other materials to be separated are continuously fed into the hopper 4ᵇ and pass down the hollow shaft to the pipes 24. The shaft 4 and the separating bowl 13 being rotated at the proper speed by power applied to the pulley 6, the centrifugal force causes the material to be separated to pass out of pipes 24. The outlet of the pipes is arranged at a point between the periphery and the center of the tank 13. The centrifugal force here causes the instant separation of the solids from the liquid, the solids yielding to the centrifugal force and passing toward the outside. The clear liquid, being forced toward the center, discharges through the pipe 26ˣ into the reservoir 26 which discharges through a pipe 26ª to any desired location.

At the beginning of the operation, the valves will be closed tightly, otherwise the sand and liquids would all pass out together and there would be no separation. These valves are held tight by the centrifugal force acting on the weights 16ᵇ, as before mentioned. The step bearing 3 upon which the peripheral shaft 4 revolves has a sliding vertical movement and is normally held at its highest point by means of the weights 11 acting on the lever 7. Now when the sands, slimes or other materials inside the separating bowl 13 accumulate, to a predetermined amount, the weight thereof over-balances the weights 11 and the said weights are raised while the bowl 13 and its attached parts descend. This causes the ring 21 to engage the adjacent arms of the bell crank levers 18 and by operating thereon controls the opening and closing of the valves 15. As the tank 13 descends by reason of the weight of its contents the bell crank levers 18 will be rocked to open the valves 15 proportionately, thus allowing a portion of the compressed sludge or separated solids to escape. As the contents of the bowl 13 become lessened by the escape of the solids through the outlet ports 13ᵉ, the weights 11 will raise the bowl 13 and disengage the collar 21 from the bell crank levers 18, thus allowing the centrifugal force to again move the weights 16ᵇ to close the valve 15, it being understood that by reason of the loose sliding movement of the rods 23 in the apertures in the hub 13ª, the rings 21—22 will always be held at their lowermost position with the ring 22 in engagement with the bearing 2. Thus it will be seen that the discharge outlets for the solid matter are automatically regulated by the amount of material fed into the separating bowl, it being understood that the discharge apertures for the liquids are always open and in communication with the tank 26.

In Fig. 7, I have shown a slightly modified form of my invention, and in this form the shaft 4 is solid, and to substitute for the hollow shaft 4 of Fig. 1, I provide a tank 30 secured to the shaft 4 above the main or separating bowl 13 into which the sluice 27 discharges. The tank 30 has a series of discharge pipes 24ˣ that discharge through the upper wall 13ᵇ of the bowl 13, the point of discharge being relatively nearer the periphery of the bowl 13 than the center thereof. In this form of my invention the valve operating bell crank levers 18 have their adjacent ends held above the upper edge of the bearing box 2 to be engaged thereby as the tank 13 settles by reason of the weight of the materials therein. In other respects this form of my invention is the same as that shown in Fig. 1.

In Fig. 8, I have shown a still further modification of my invention in which the pipes 24× instead of discharging from the tank 30 in a direct line into the bowl 13, the discharge pipe 24× may be bent into a right angled form, as shown in Fig. 8, thus discharging from the tank 24 at right angles to the shaft 4 to enter the bowl 13 at right angles to its plane of rotation.

In Fig. 9, I have shown a modified form of valve operating mechanism in which the valve lever 16 has its weight 16ᵇ dispensed with and to perform the function of the weight 16ᵇ I provide a magnet armature 35ᵃ which is connected to the lever 16 by a link 36 as shown, the armature 35ᵃ being in the nature of the plunger type to coöperate with the solenoid magnets 35. Thus it will be seen that the centrifugal force acting upon the armatures 35ᵃ will tend to close the valves 15 and the action of the magnets 35 will tend to open them. The magnets 35 may be energized by any suitable means and controlled through a switch in direct control of the operator, if desired, although I prefer to have them controlled automatically, and with that result in view any suitable commutating and contact making device may be attached to the shaft 4 so that the movement of the shaft 4 will control the energization of the magnets 35. A suitable controller is diagrammatically represented in Fig. 13, by reference to which it will be seen that a contact making arm 37 is connected to the shaft 4 and coöperates with the contact plates 38 of any suitable rheostat.

In Figs. 11 and 12 I have shown a slightly further modification of my invention in which the bell crank levers 18 are disposed with and the connecting rods 2ᵖ are joined with the plate 40 loosely mounted on the shaft 4 and having a cog rim 40ᵃ that meshes with a pinion 41ᵇ of an electro motor 41 so that the rotation of the motor 41 will turn the plate 40 and open the valves 15, it being understood that the weights 16ᵇ serve to hold the valves 16 closed when the motor 41 is not operated. The motor 41 may be controlled by a mechanism similar to that shown in Fig. 13, if desired. I prefer to use the electro magnetic operating means for the rings where it is desirable to have the machine very sensitive on account of but slight differences in the specific gravity of the solids to be extracted, and where the machine is very small, the electro magnetic operating means may be preferable.

I do not confine myself to the use of the weights for closing the valves 15, as springs may be used in place thereof for instance, as indicated in Fig. 14, it being understood that springs are the equivalents of weights and may be used wherever weights are mentioned in this specification.

From the foregoing it will be noted that the hollow shaft 4 and hopper 4ᵇ of the form of my invention shown in Figs. 1 and 2, form a receiver for the material to be separated, while the tank 30 of the form shown in Figs. 7 and 8 forms such receiver.

From the foregoing description taken in connection with the accompanying drawings it is thought the complete construction, operation and numerous advantages of my invention will be readily understood by those skilled in the art to which it appertains, and I desire it understood that many slight changes in the detail construction, arrangement and correlation of parts may be made without departing from the spirit of the invention or the scope of the appended claims.

What I claim is:—

1. In a centrifugal separator, a rotatable separating bowl having peripheral outlets and movable under the influence of gravity, means for counterbalancing said bowl, means for admitting material to be separated into said bowl, valve devices for said peripheral outlets, means controlled by centrifugal force for holding said valve devices seated, fluid outlets for said separating bowl, a collecting tank into which said fluid outlets discharge, an off-take from said collecting tank, and means goverened by the weight of the materials within the separating bowl for controlling the opening of the peripheral outlet valves, substantially as shown and described.

2. In a centrifugal separator, a rotatable separating bowl having peripheral outlets, means for admitting the material to be separated into said bowl, valve devices for said peripheral outlets, means controlled by centrifugal force for holding said valve seated, fluid outlets for said separating bowl, a collecting tank into which said fluid outlets discharge, an off-take from said collecting tank, means governed by the weight of the material within the separating bowl for automatically opening the peripheral outlet valves.

3. A centrifugal separator, comprising the combination with a rotatable shaft, a separating bowl mounted thereon, and rotatable therewith, said separating bowl having a plurality of peripheral outlets, control valves for said peripheral outlets, means controlled by centrifugal force for maintaining said valves closed, a receiving means for the material to be separated, means for conveying the material to be separated from the receiving means and discharging it into the separating bowl, liquid off-take pipes communicating with said separating bowl, a tank in communication with said liquid off-take pipes and means controlled by the weight of the materials to be separated, for opening said peripheral valve outlets.

4. In a centrifugal separator, the combination with a rotatable shaft, and a separating bowl mounted thereon to turn therewith, said separating bowl having a plurality of valve controlled peripheral outlets, means for normally holding said valves closed, means for opening said valves at times, a receiver for the material to be separated, a plurality of pipes leading from said receiver into said separating bowl, to discharge the material into the separating bowl, a liquid receiving tank, liquid off-take pipes communicating with the separating bowl and discharging into the liquid receiving tank, means for conveying the liquid away from the liquid receiving tank, all being arranged substantially as shown and described.

5. A centrifugal separator, comprising in combination with a rotatable shaft, and a rotatable separating bowl having peripheral outlets, means for discharging the material to be separated into said separating bowl at predetermined places, liquid off-take pipes for said separating bowl, said separating bowl having peripheral outlets, valves for closing said peripheral outlets, said valves each comprising a pivotally mounted valve lever, centrifugally operated means carried by each of said valve levers for normally holding the valves closed, a bell crank lever for each valve, a connecting rod between the bell crank and the valve lever, and means coöperating with the bell crank levers for opening the valves at predetermined times, substantially as shown and described.

6. In a centrifugal separator, the combination with a supporting frame, a tubular rotatable shaft mounted therein, means for rotating said shaft said shaft having a solid end formed with a step bearing portion, said shaft being mounted for longitudinal movement, a longitudinally movable step bearing engaging the slotted end of said shaft, centrifugal separating devices held on said shaft and in communication with the interior thereof, means for normally holding said shaft elevated, said separating means including a separating bowl having valve controlled outlet ports, and means controlled by the weight of the materials to be separated for opening the outlet port valves, substantially as shown and described.

7. In a centrifugal separator, the combination with a rotatable shaft, a rotatable separating tank mounted therein, means for admitting materials to be separated into said separating tank, liquid outlets for said separating bowl, peripheral outlets for said separating tank, valve devices for normally holding said peripheral outlets closed, said separating bowl and said rotatable shaft being mounted for longitudinal movement, of means for counter-balancing the weight of said separating tank and shaft, and means controlled by the weight of the materials to be separated for operating said peripheral valve outlets, substantially as shown and described.

8. In a centrifugal separator, the combination with a supporting framework, a bearing box mounted thereon, a rotatable shaft mounted in said bearing box and in bearings in said frame-work, said shaft having longitudinal movement, of a longitudinally movable step bearing for the lower end of said shaft, said bearing box and said step bearing having slotted portions, a lever passing through said slotted portions and fulcrumed in said step bearing, a link fulcrumed to said supporting frame and said lever, counterbalancing weights for moving said lever to move the step-bearing in one direction, a rotatable separating bowl carried by said shaft and movable therewith, said shaft having a longitudinal passage from the separating bowl outward to one end thereof, a plurality of radial pipes communicating with the central passage of the shaft and with the interior of the separating tank, liquid outlets for said separating bowl, a liquid receiving tank held in communication with said liquid outlets, valve controlled peripheral outlets for said separating bowl, valve operating lever devices for coöperating with the peripheral outlet valves, means for normally holding said peripheral outlet valves closed, and means controlled by the weight of the materials to be separated for opening said peripheral outlet valves at times.

9. In a centrifugal separator, the combination with a supporting framework, a bearing box mounted thereon, a rotatable shaft mounted in said bearing box and in bearings in said frame-work, said shaft having longitudinal movement, of a longitudinally movable step bearing for the lower end of said shaft, said bearing box and said step bearing having slotted portions, a lever passing through said slotted portions and fulcrumed to said step bearing, a link fulcrumed to said supporting frame-work and said lever, counter-balancing weights for moving said lever to move the step bearing in one direction, a rotatable separating bowl carried by said shaft and movable therewith, said shaft having a longitudinal passage from the separating bowl outward to one end thereof, a plurality of radial pipes communicating with the central passage of the shaft, and with the interior of the separating tank, liquid outlets for said separating bowl, a liquid receiving tank held in communication with said liquid outlets, valve controlled peripheral outlets for said separating bowl, valve operating lever devices for coöperating with the peripheral outlet valves, means for normally holding said peripheral valve outlets closed, means controlled by the weight of the materials to be separated for opening said peripheral valve outlets at times, said last named means comprising collars on the rotatable shaft, connecting rods between said collars, said collars held to be engaged by the valve controlling levers as the weight of the materials in the separating bowl overcomes the counter-balancing means. substantially as shown and described.

10. In a centrifugal separator, the combination with a rotatable shaft, a separating bowl carried thereby having a central hub portion and centrally arranged liquid discharge pipes, said bowl having a plurality of peripherally arranged outlet ports, valves for closing said outlet ports, pivotally mounted weighted valve levers for said valves, bell crank levers mounted on said tank, connecting rods between said bell crank levers and said valve levers, a liquid receiving tank communicating with the liquid discharge pipes of the separating bowl, a receiving means for the materials to be separated, pipes for conveying the materials to be separated from the receiving means into the separating bowl, and means coöperating with said bell crank levers for opening said peripheral outlets as the weight of the materials to be separated increases beyond a predetermined amount, substantially as shown and described.

11. In a centrifugal separator, the combination with the supporting framework, of a rotatable shaft mounted therein having longitudinal movement, a step bearing for the lower end of said shaft also having longitudinal movement, means for normally holding said step bearing and shaft in one position of longitudinal movement to counterbalance the weight of the shaft and its attached parts, a separating bowl rotatably mounted on said shaft to turn therewith, said separating bowl comprising a hub portion, a peripheral rim, and top and bottom plates connecting the hub portion and peripheral rim, said shaft having a longitudinal channel and provided with a hopper-mouth, a plurality of radially arranged pipes passing through the separating bowl hub and communicating with the interior of the shaft, a plurality of liquid outlet pipes carried by said separating bowl and communicating with the interior thereof at points adjacent the hub, a liquid receiving tank beneath the separating bowl into which the liquid off-take pipes of the separating bowl discharge, said separating tank having valve controlled peripheral outlets, valve levers fulcrumed on said separating bowl, centrifugally operated means for holding said peripheral outlets closed, bell crank levers mounted on said separating bowl, connecting rods between the bell crank levers and the valve levers, and means engageable by said bell crank levers at times for moving the same to open the peripheral outlets, substantially as shown and described.

12. In a centrifugal separator, the cmbination with a supporting framework, of a rotatable shaft mounted therein and having longitudinal movement, a step bearing for the lower end of said shaft also having longitudinal movement, means for normally holding said step bearing and shaft in one position of longitudinal movement to counterbalance the weight of the shaft and its attached parts, a separating bowl rotatably mounted on said shaft to turn therewith, said separating bowl comprising a hub portion, a peripheral rim, and top and bottom plates connecting the hub portion and peripheral rim, said shaft having a longitudinal channel and provided with a hopper-mouth, a plurality of radially arranged pipes passing through the separating bowl hub and communicating with the interior of the shaft, a plurality of liquid outlet pipes carried by said separating bowl and communicating with the interior thereof at points adjacent the hub, a liquid receiving tank beneath the separating bowl into which the liquid off-take pipes of the separating bowl discharge, said separating tank having valve controlled peripheral outlets, valve levers fulcrumed on said separating bowl, centrifugally operated means for holding said peripheral outlets closed, bell crank levers mounted on said separating bowl, connecting rods between the bell crank levers and the valve levers, means engageable by said bell crank levers at times for moving the same to open the peripheral outlets, said last named means comprising a pair of collars loosely mounted on said shaft on each side of the separating bowl, rods loosely passing through apertures in the separating bowl hub and connecting said collars together, all being arranged as shown and described.

HARVEY D. DIBBLE.

Witnesses:
D. H. BUNNELL,
ESTELLE BUNNELL.